(No Model.)
W. H. DICKERHOOF.
GUIDE FOR TROLLEY WHEELS.
No. 531,291. Patented Dec. 18, 1894.
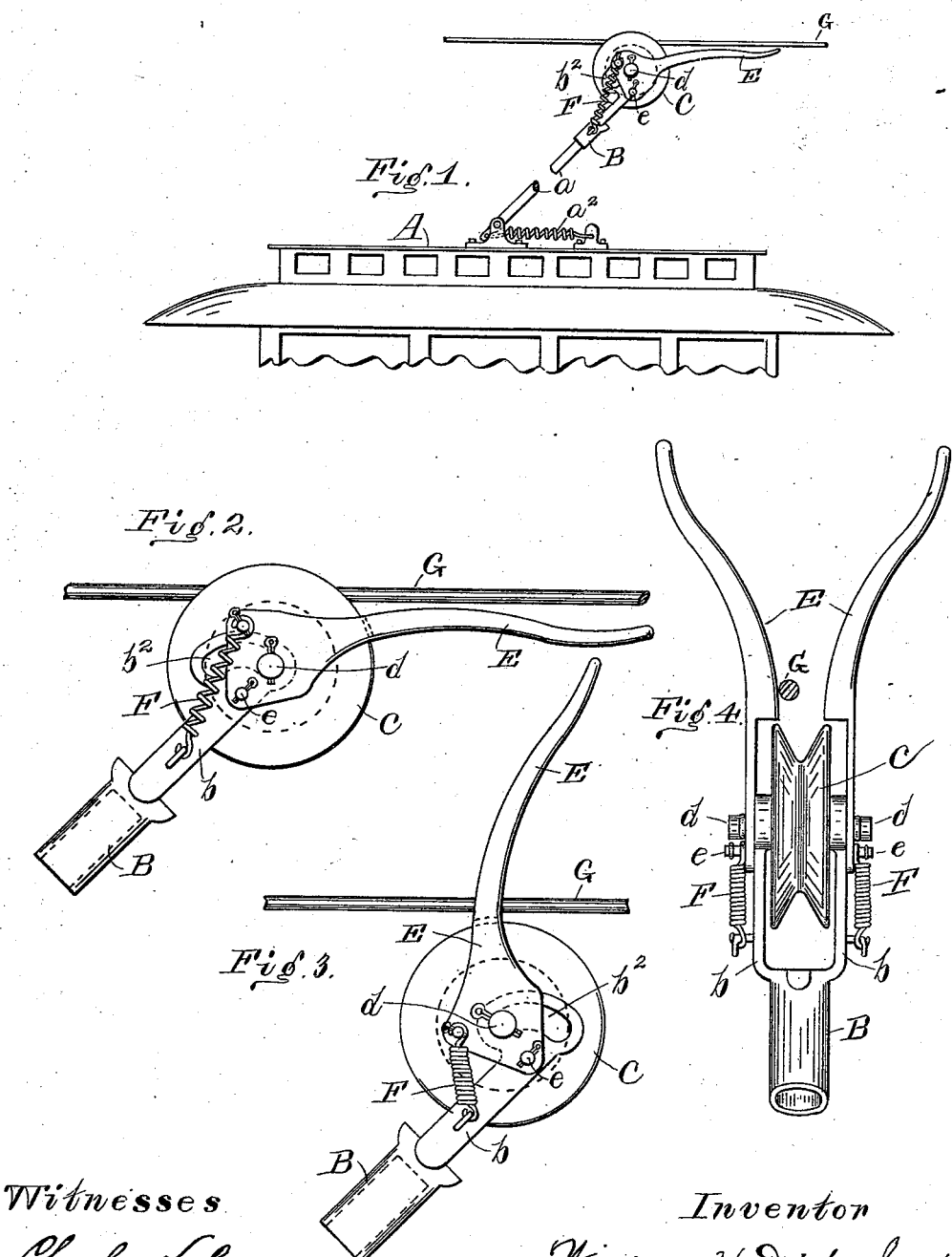
Witnesses
Charles Lehmer
Nathan Rosenthal
Inventor
William H. Dickerhoof
per O. M. Hill
Attorney

UNITED STATES PATENT OFFICE.

WILLIAM H. DICKERHOOF, OF CINCINNATI, OHIO, ASSIGNOR OF ONE-HALF TO GEORGE W. POLLOCK, OF SAME PLACE.

GUIDE FOR TROLLEY-WHEELS.

SPECIFICATION forming part of Letters Patent No. 531,291, dated December 18, 1894.

Application filed July 23, 1894. Serial No. 518,319. (No model.)

*To all whom it may concern:*

Be it known that I, WILLIAM H. DICKERHOOF, a citizen of the United States, residing at Cincinnati, in the county of Hamilton, State of Ohio, have invented certain new and useful Improvements in Guides for Trolley-Wheels, of which the following is a specification, reference being had to the accompanying drawings.

My invention is designed for use in connecton with electric railways having what is known as the "overhead system" which has a suspended circuit-wire and a trolley attached to a pole or arm mounted on a car, said trolley being held into contact with said wire by means of a yielding pressure, in the usual manner.

The object of my invention is to provide guard-arms at each side of and projecting out beyond the peripheral flanges of the trolley, said arms being so arranged and connected with the trolley, as that the pressure exerted upon the latter will retain said arms in a normal position below a plane with any cross-wire. Said parts are so arranged that, so soon as the trolley jumps or escapes from off its circuit wire, the guard-arms will instantly act and vibrate upward at each side of said wire.

In the accompanying drawings:—Figure 1, is a side elevation of a trolley provided with my invention in an operative position, the supporting arm, which connects the trolley with the car, being broken away. Fig. 2, is an enlarged side view of the trolley shown in Fig. 1, in position against a circuit-wire, and Fig. 3, is a similar view, showing the position of the guides when the trolley has left the wire. Fig. 4, is a face view taken at left hand of Fig. 3.

In the drawings, A, represents the top of a car to which is attached an arm, *a*, the latter having some suitable elastic connection, as spring $a^2$, for causing an upward pressure upon the free end of said arm, in a manner usually incident to electric cars of this system.

B, represents a socket which is adapted to fit over the end of arm, *a*, to which socket is attached the two bearing-arms, *b*, upon which the trolley, C, is mounted. The arms *b* are preferably provided with an elongated slot, $b^2$, near their end portions, within which slots the shaft or journal, *d*, of the trolley is mounted. These slots are preferably of a circular outline to permit the shaft of the trolley to play therein, as will presently appear. The shaft, *d*, is passed through the trolley, slots $b^2$ and through an opening formed in the lower end portion of the guide-arms, E, said shaft having a suitable fastening at each end to hold it in position.

The guide-arms are pivoted upon suitable lugs, *e*, cast with or attached to the outer face of the arms, *b*, said guide-arms having a coiled-spring, F, or other elastic connection attached thereto on the enlarged lower end portion thereof, as shown, the opposite end of each spring or connection being attached to the arms, *b*. If desired, said springs may be attached to the socket, B, instead of to its arms.

G, is representative of a circuit-wire over which the trolley travels.

The operation of my invention is as follows: As before stated, the trolley is held in contact with the circuit-wire under a yielding force or pressure, and the arms, upon which said trolley is mounted, are at an angle to said wire. The upward force or pressure applied to the trolley, so soon as it comes into contact with the circuit-wire, vibrates said trolley and its shaft, *d*, rearward; and, the rearward circular movement of said shaft within the slots $b^2$, causes the guide-arms E to swing backward on their pivot-points, *e*, until the free end of said arms are lowered out of the way of all cross-wires or other obstructions, as shown in Figs. 1 and 2. The trolley and its guide-arms remain in the position shown in Figs. 1 and 2, until said trolley, for any cause, shall leave its wire, at which instant the contact pressure is removed and the springs F immediately act to swing the guide-arms, E, upward, as shown in Figs. 3 and 4, which movement carries with said arms the shaft *d* and its trolley,—the shaft resting within the opposite end of the slots, $b^2$, from that shown in Figs. 1 and 2. It will be readily seen from the foregoing description, that the trolley can leave its wire but for an instant, for the reason that the guide-arms will not permit the trolley to vibrate laterally from beneath said wire, and the continuous upward pressure upon the trolley will cause i to find the wire at once, when the guide-arms will be again lowered, in the manner before stated.

The advantages of my invention are apparent, being simple and reliable in operation and cheap of manufacture. The feature of having the guide-arms lowered out of contact with cross-wires, and the mechanical means for elevating them when the trolley shall leave its wire, are valuable features for the purposes desired.

I am aware that it is not new, broadly, to provide a trolley with guide-arms, but

What I claim as new, and desire to secure by Letters Patent, is—

1. A trolley having its axis mounted on bearings and capable of a vibratory movement thereon independent of the movement of said bearings, guide-arms connected with said axis and pivoted to said bearings, and a yielding connection between said guide-arms and the bearing supports, substantially as set forth.

2. In combination with the guide-arms, the bifurcated bearings attached to the trolley-pole, a trolley having its axis attached to said guide-arms, said axis being mounted upon said bearings and capable of a vibratory movement thereon independent of the movement thereof, said guide-arms being pivotally connected to said bearings, and a yielding connection between the latter and said arms for vibrating the latter and the trolley-axis so soon as pressure is removed from the trolley.

3. The combination of trolley C having an axis, $d$, bearings $b$ having an elongated circular slot $b^2$ therein within which said axis is mounted, guide-arms E pivotally connected to said bearings beneath said slot, the axis $d$ projecting through said arms, the latter being yieldingly connected with the bearings, and means for attaching the latter to the trolley-pole.

WILLIAM H. DICKERHOOF.

Witnesses:
O. M. HILL,
GEO. W. POLLOCK.